United States Patent [19]

Barkstroma et al.

[11] 3,807,153
[45] Apr. 30, 1974

[54] ALL SPACING FORAGE HARVESTER

[75] Inventors: Reynold Barkstroma, Hinsdale; Charles V. Everett, Warrenville; Harold G. Meitl, Darien, all of Ill.

[73] Assignee: International Harvester Company, Chicago, Ill.

[22] Filed: Apr. 27, 1973

[21] Appl. No.: 355,112

[52] U.S. Cl............................ 56/226, 56/167, 171/56
[51] Int. Cl............................................. A01d 57/02
[58] Field of Search........................... 56/158–172, 56/219–227, 372, DIG. 1; 171/52–54, 56

[56] References Cited
UNITED STATES PATENTS
3,360,912  1/1968  Erdman et al. ............... 56/220
3,742,689  7/1973  Barows et al. ............... 56/226

FOREIGN PATENTS OR APPLICATIONS
471,464  7/1914  France ........................ 56/220
280,339  11/1914  Germany ...................... 56/220
740,686  1/1933  France ........................ 56/219
80,492  5/1951  Czechoslovakia ............... 56/220

Primary Examiner—Russell R. Kinsey
Attorney, Agent, or Firm—Neal C. Johnson; Floyd B. Harman

[57] ABSTRACT

A crop harvesting platform for a forage harvester or combine including a cutter, a crop-consolidating auger, and an improved crop-gathering reel. The reel sweeps a standing crop rearwardly for cutting by the cutter and conveyance by the auger rearwardly for subsequent harvesting steps. The reel is designed to operate without regard to the row-spacing, or density, or height of crops such as corn, milo, cane, sudex, and hay crops ranging from rye to alfalfa.

23 Claims, 7 Drawing Figures

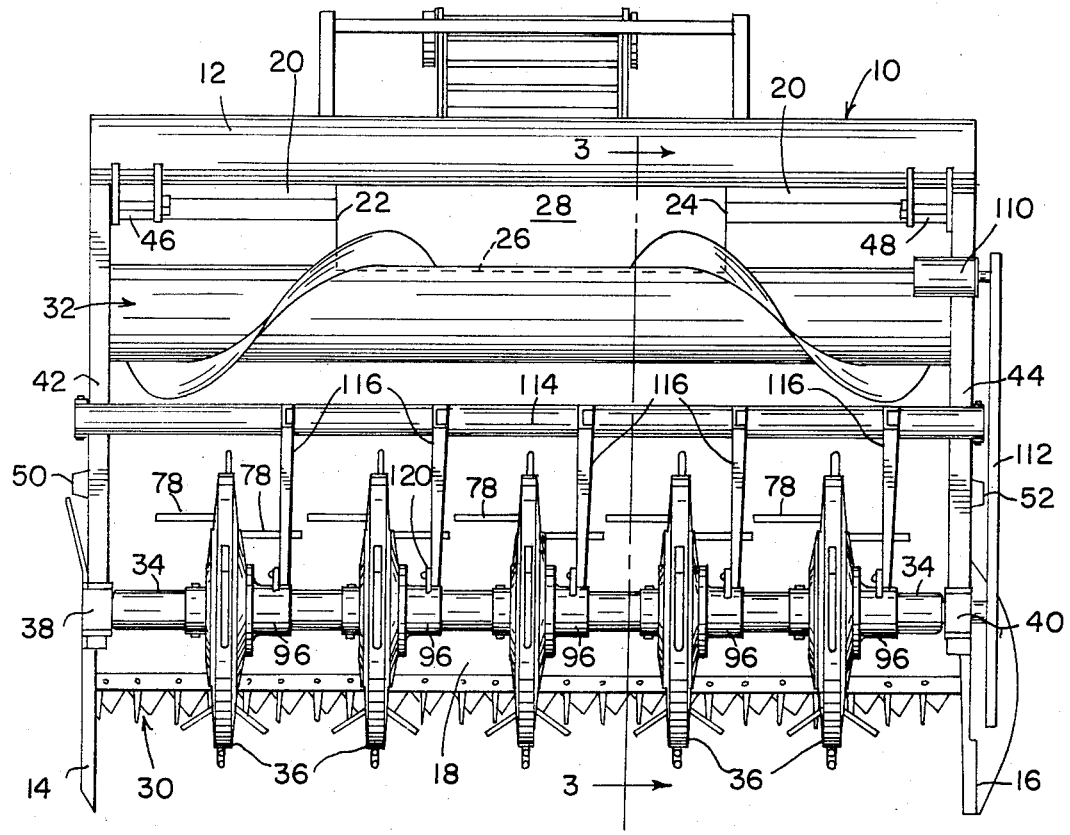

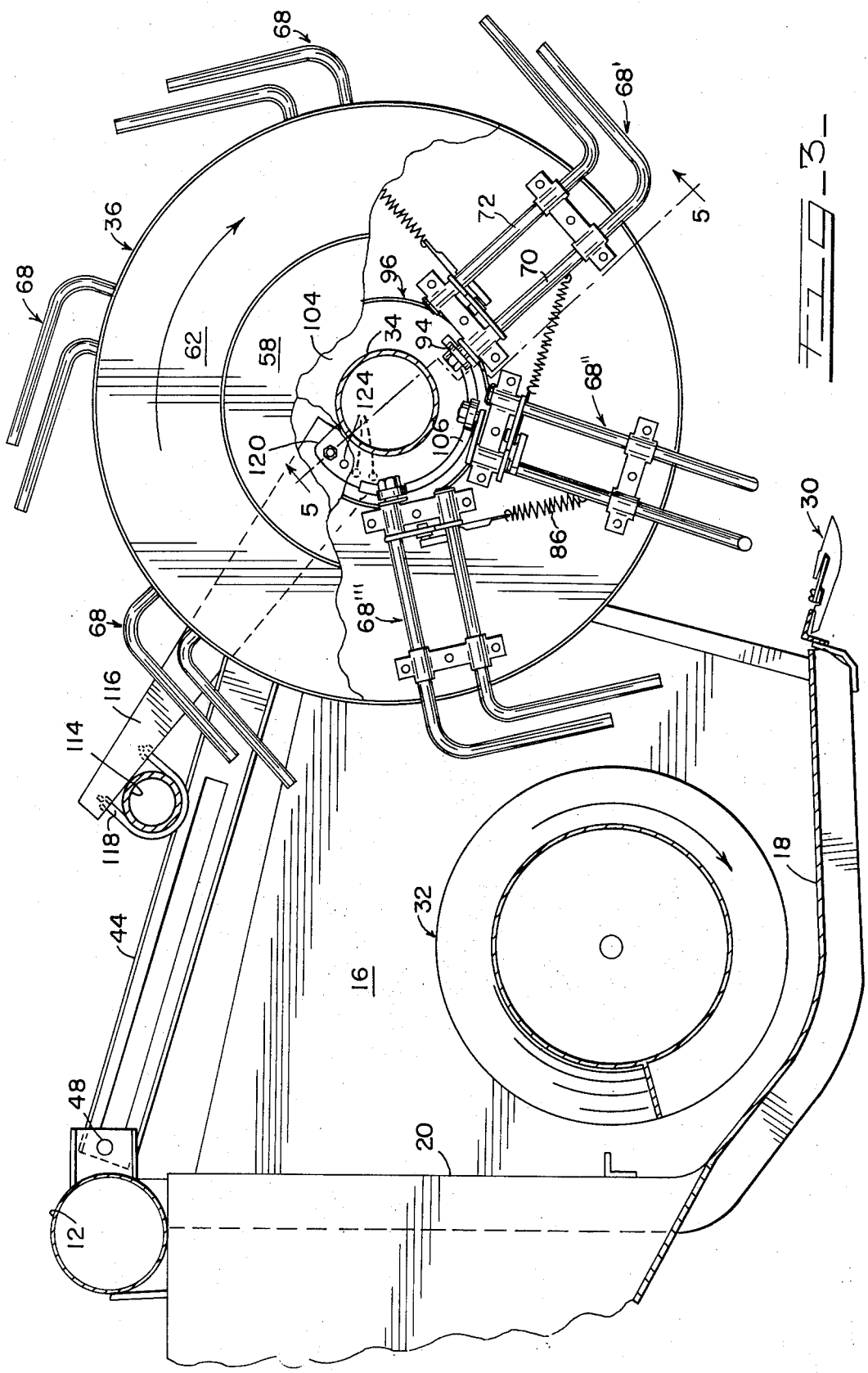

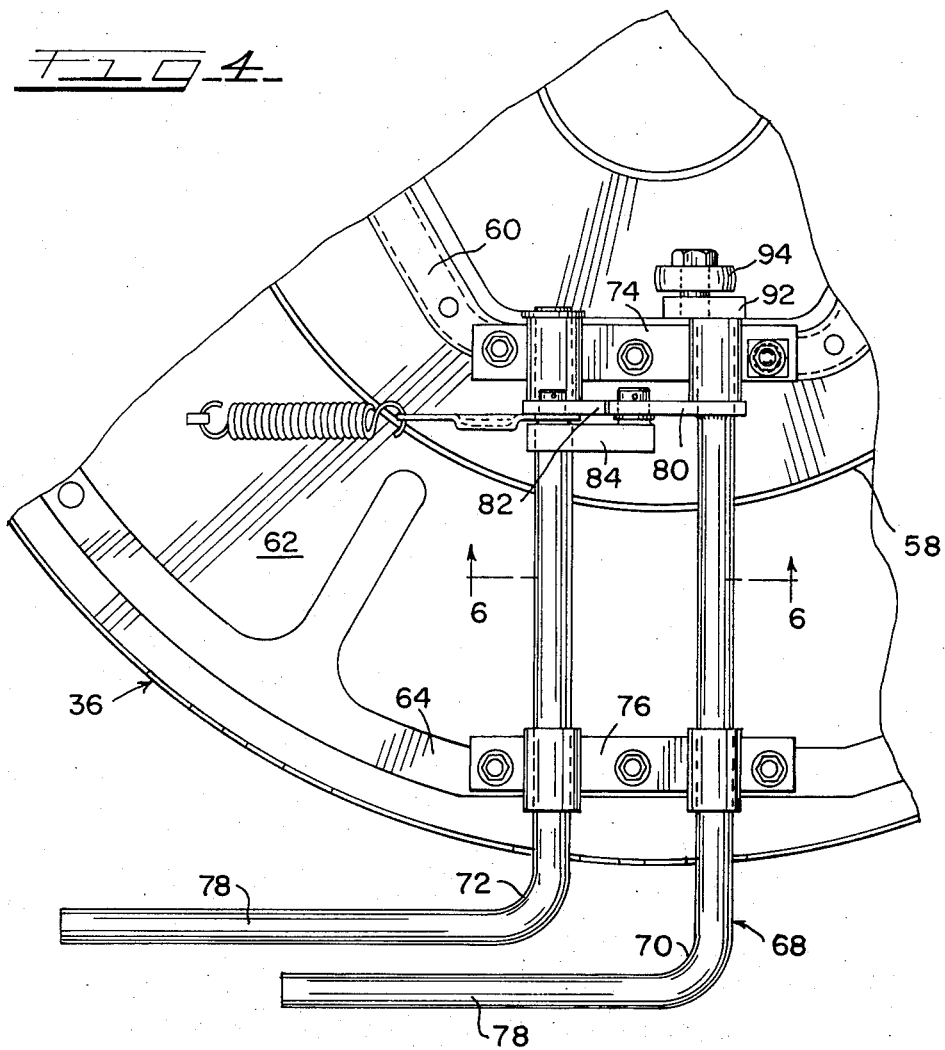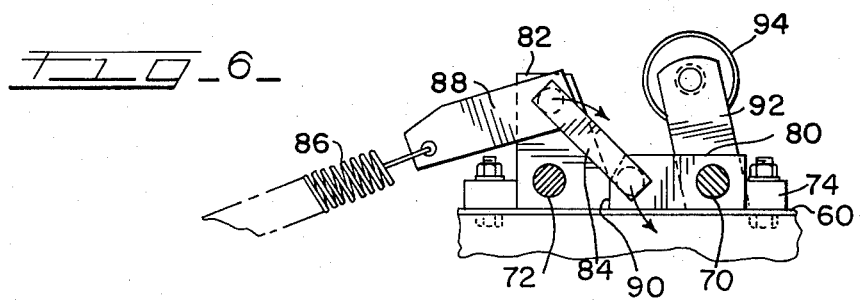

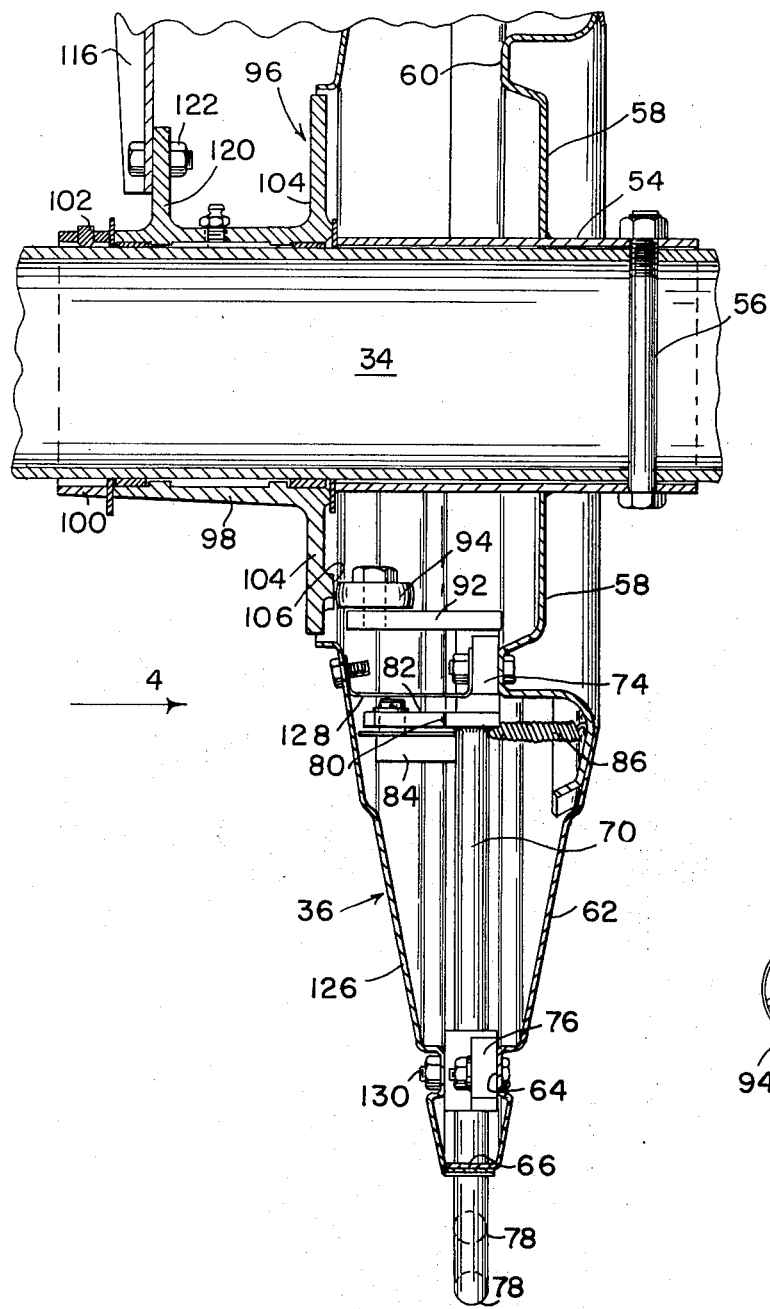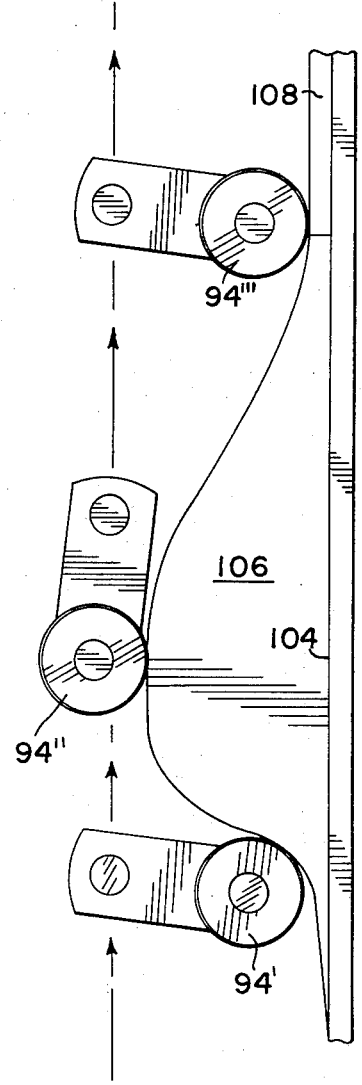

ALL SPACING FORAGE HARVESTER

CROSS REFERENCE TO RELATED APPLICATION

This application relates generally to improvements in non-row sensitive crop harvesting machines disclosed in assignee's copending application Ser. No. 199,949, now U.S. Pat. No. 3,742,689 filed Nov. 18, 1971.

BACKGROUND OF THE INVENTION

1. Field of the Invention

This invention relates improved to crop harvesting platforms and more particularly to an improveed crop-gathering reel for row-planted for broadcast crops.

2. Description of Prior Art

The crop harvesting platform and reel disclosed in the above-noted application represents what might be termed the first generation machine of assignees' design for harvesting crops including corn, whether row-planted or broadcast. It will be noted that in both embodiments disclosed therein the reel consists of a relatively large number of parts, particularly in the mounting for and actuation of the crop-engaging fingers. Of course the costs of manufacture, assembly and maintenance increase as the complexity of the machine increases.

Several U.S. Pats. have been found which disclose reels having actuatable crop-engaging elements: Campbell No. 907,966, Bransgrove No. 670,662, Thompson No. 1,271,803, and Cody No. 450,860. In all these patents it is clearly disclosed that the purpose is to pick up fallen grain to a level above the cutter. It is apparent that these devices are not intended for the rigors of harvesting a full range of crops including relatively tall and heavy crops such as corn, milo, sudex, cane or the like.

Of course it is desirable that a crop harvester intended for use in a wide variety of crops be capable of harvesting such crops with no adjustment being required from crop to crop. At the very least any such adjustments should be easy to make in the field without requiring extensive tools and time.

SUMMARY

The invention provides an improved crop-gathering reel for a crop-harvesting platform wherein the reel includes at least one crop-penetrating disk assembly carrying at least a pair of crop-engageable peripheral fingers actuatable to engage the standing crop on opposite sides axially of the disk assembly to move the crop rearwardly for cutting. The reel is constructed to harvest a wide variety of crops with little or no adjustment being required, depending on the particular crop.

Each disk assembly of the reel presents a progressively radially outwardly narrowing crop penetrating profile to minimize deflection of the standing crop prior to cutting. At the same time the structure for actuating the fingers into crop-engaging operative position is enclosed within the disk assembly out of crop-entangling relation.

Briefly, the objects of the invention are: to provide a crop-harvesting platform with a crop-gathering reel capable of use in a wide variety of crops such as corn, whether planted in rows or broadcast, tall crops such as cane and sudex, and hay crops ranging from rye to alfalfa; to provide a rugged reel for high speed, high capacity harvesting; and to provide such a reel wherein adjustments required for a variety of crops and crop conditions are minimal and easily accomplished.

BRIEF DESCRIPTION OF THE DRAWINGS

FIG. 1 is a plan view of a harvesting platform including the improved crop-gathering reel of the invention;

FIG. 2 is a front elevation view of the platform of FIG. 1;

FIG. 3 is an enlarged sectional view taken along the line shown by the arrows 3—3 in FIG. 1;

FIG. 4 is an enlarged fragmentary elevation of a portion of a disk assembly taken generally in the direction of arrow 4 in FIG. 5;

FIG. 5 is an enlarged fragmentary sectional view taken in the direction of the arrows 5—5 in FIG. 3;

FIG. 6 is a fragmentary sectional view taken along lines 6—6 of FIG. 4; and

FIG. 7 illustrates a flat projection of an annular cam surface engageable by rollers of successive finger units to be described.

DESCRIPTION OF PREFERRED EMBODIMENT

Referring first to FIGS. 1 and 2 there is shown a crop-harvesting platform 10 mountable on a forage harvester or combine for example. The basic framework of the platform is of conventional construction and is elongated transversely to the normal forward direction of travel of the machine. A tubular member 12 extends lengthwise of the platform to define the upper rear edge thereof. A pair of vertical endwalls 14 and 16 project forwardly from opposite ends of the member 12 to define the ends of the platform. The bottom of the platform is defined by a wall 18 disposed between the endwalls 14 and 16 and extending rearwardly and upwardly (FIG. 3) to merge into a rear wall 20 which extends upwardly into welded connection with the tubular frame member 12. As shown in FIGS. 1 and 2 the rear wall 20 includes a pair of parallel edges 22 and 24 joining a horizontal bottom edge 26 — these edges defining a central crop discharge opening 28 in conjunction with the member 12.

A reciprocable cutter 30 of conventional construction is disposed along the forward edge of the platform bottom wall 18 for cutting a standing crop as the platform is moved forwardly. A crop-consolidating auger 32 is journaled in the endwalls 14 and 16 rearwardly of the cutter 30 for conveying the cut crop toward the center of the platform and rearwardly through the crop discharge opening 28 for subsequent harvesting steps. The cutter 30 and auger 32 are driven by conventional means (not shown) from the power source of the harvester.

In accordance with the invention, the platform is provided with an improved crop-gathering reel which in general includes a central tubular shaft 34 and a plurality of disk assemblies 36 mounted on the shaft 34 in spaced parallel relation along the length of the shaft to define crop-receiving spaces therebetween. The opposite ends of the reel shaft 34 are journaled in brackets 38 and 40 adjustably mounted on respective arms 42 and 44. The arms 42 and 44 are pivoted to the frame member 12 at 46 and 48 respectively and extend forwardly therefrom in parallel relation at opposite ends of the platform as shown. The arms 42 and 44 are pivotable in unison to thus raise or lower the reel by a pair of hydraulic piston-cylinder units 50 and 52 connected respectively between the endwall 14 and arm 42 and the endwall 16 and arm 44.

The construction of each of the identical disk assemblies 36 will be seen more clearly with reference to FIGS. 3 through 6. As shown in FIG. 5 a cylindrical tube 54 is received about the shaft 34 and connected thereto by a bolt 56. An annular plate 58 is welded to the outer periphery of the tube 54 and is shaped to include a polygonal rib 60 disposed about the shaft for purposes to be described. Secured to the outer periphery of the plate 58 is an annular cover or shield 62 of general frusto-conical shape. The shield 62 is formed to include a polygonal rib 64 disposed about the shaft in a common radial plane with the rib 60. The shield 62 terminates at its outer periphery in an axially extending annular rim 66.

As shown most clearly in FIG. 3 each of the disk assemblies 36 includes a plurality of identical multiple-finger units 68 disposed in circumferentially spaced relation. The details of a finger unit 68 are best seen with reference to FIGS. 4 through 6. The unit 68 includes a pair of fingers 70 and 72 disposed in spaced parallel relation in a common plane at right angles to the shaft 34. The fingers 70 and 72 are journaled in a pair of bearing blocks 74 and 76 bolted to the ribs 60 and 64 respectively. Each of the fingers 70 and 72 includes a crop-engaging portion 78 extending at a right angle and disposed beyond the periphery of the disk assembly.

The fingers 70 and 72 are interconnected through a linkage to be now described which permits the fingers to be pivoted in unison in opposite directions about their respective pivot axes. With reference to FIGS. 4 through 6, an arm 80 is welded to the finger 70 just beneath the bearing block 74 and extends generally toward the other finger 72. An arm 82 is welded to the finger 72 in the same plane as the arm 80 and extends away from the finger 72 in a direction generally axially of the reel. A link 84 is pivotally connected at each end to the arms 80 and 82. Accordingly, swinging or pivoting movement of the finger 70 in one direction of rotation causes the other finger 72 to pivot conjointly in the opposite direction as indicated by the arrows in FIG. 6.

As shown in FIGS. 3 through 6 the fingers 70 and 72 of each unit 68 are in an inoperative position wherein the crop-engaging portions 78 are within the plane of the pair of pivot axes and are disposed in a direction which trails the direction of rotation of the reel. Accordingly the portions 78 present a narrow profile to facilitate penetration of the standing crop and thus avoid entanglement therewith or premature bending thereof. This inoperative position is yieldably maintained by a coil spring 86 connected between the shield 62 and a metal link 88 which is in turn connected to the link 84. The spring 86 exerts a force to maintain the arms 80 and 82 in interengagement along a stop surface shown at 90 in FIG. 6.

An operative feature of the reel is in the provision of means for successively swinging or pivoting the fingers of each unit 68 from the inoperative position to an operative position projecting into the crop-receiving spaces on opposite sides of each disk assembly 36 and back to the inoperative position in sequence as each unit 68 is moved rearwardly over the cutter 30. While in the operative position the finger portions 78 engage the standing crop and move the same rearwardly for cutting and onto the auger 32 for transverse consolidation.

As shown in FIGS. 4 through 6 an arm 92 is fixed to the inner end of the leading finger 70 above the bearing block 74 and projects generally axially of the reel as shown in FIGS. 5 and 6. A roller 94 is journaled on the arm 92 as shown.

As shown generally in FIGS. 1 and 2 a cam member 96 is mounted on the reel shaft 34 adjacent each of the disk assemblies 36. As shown in more detail in FIGS. 3 and 5, the cam member 96 includes a cylindrical hub 98 received about the shaft 34 adjacent to the tube 54. A retaining ring 100 is secured on the shaft 34 by a set screw 102 at the other end of the hub 98. An annular flange 104 projects radially from the hub 98. As shown generally in FIG. 3 a cam lobe 106 projects axially from the flange 104 concentrically about the axis of the shaft 34 throughout an arc as shown. A flat projection of the cam lobe 106 is shown in FIG. 7 to illustrate the extention of the lobe into the path of rotation of the successive rollers 94 together with the shape of the effective surface against which the rollers are engageable. As shown partially in FIG. 7 a strip 108 of resilient cushioning material such as urethane for example, is secured to the radial flange 104 in trailing relation to the cam lobe 106 through an arc of approximately 80° to provide a cushioning surface against which the rollers engage to decrease the vibration and noise of rapid successive operation.

It will be understood that the reel is rotated relative to the cam members. Means for rotating the reel include a hydraulic rotary motor 110 shown mounted on the arm 44 in FIGS. 1 and 2 and a chain and sprocket drive shown generally at 112 extending between the motor and the shaft 34. The structure for holding the cam members 96 against rotation is shown generally in FIGS. 1 and 2. A pipe 114 is clamped to the arms 42 and 44 rearwardly of the disk assemblies 36. A plurality of channel-shaped braces 116 is connected to the pipe 114 by U-bolts, 118 (FIG. 3) at spaced intervals along the pipe. The braces 116 extend forwardly and downwardly adjacent to respective ones of the disk assemblies 36 into connection with respective cam members 96. As shown in FIGS. 3 and 5, a semi-annular flange 120 projects radially from the hub 98 in spaced relation to the annular flange 104. The forward end of each brace 116 is connected to the flange 120 by a bolt and nut assembly 122.

As shown generally in FIG. 3, the flange 120 includes a plurality of openings 124 spaced circumferentially about the axis of the reel shaft 34. The cam member 96 may thus be connected to the brace 116 at any one of the plurality of positions rotated about the axis of the shaft. This enables one to preselect the point at which the fingers are swung into and out of operative position as dictated by various crop types and conditions.

In the preferred embodiment of the invention shown and described herein, it is apparent that the disk assemblies 36 constitute leading portions of the harvester as it is moved into the standing crop. Moreover, it may be necessary to rotate the reel at considerable speeds to harvest a crop, particularly one of high density. This combined action of forward speed and speed of rotation could present problems if the crop were to become entangled with the reel or be deflected below the cutter as the harvester platform is moved thereover. The above-mentioned frusto-conical shield 62 extends radially outwardly from the plate 58 as shown in FIG. 5. Somewhat similarly an annular frusto-conical cover or shield 126 is disposed radially outwardly from adjacent the flange 104 into bolted connection with the rim 66 of the shield 62. The shield 126 is secured to the bearing blocks 74 and 76 by brackets 128 and bolts 130 respectively. It is apparent that the shields 62 and 126 cover or enclose the operative elements of the structure for actuating the crop-engaging fingers. Specifically it is seen in FIG. 5 that the cam lobe 106, roller 94, and linkage elements 80, 82, and 84 are disposed out of possible crop-entanglement. It is further apparent that the shields 62 and 126 define radially outwardly converging walls of each disk assembly which present a progressively radially narrowing crop penetrating profile to minimize deflection of the standing crop.

The operation of the harvesting platform with the improved reel of the invention can be briefly summarized. The height of the reel can be readily adjusted by the conjoint extension and retraction of the cylinders 50 and 52. The rotary hydraulic motor 110 is preferably operated through controls enabling the operator to selectively adjust the speed of rotation of the reel for optimum results. As the platform is moved forwardly the standing crop is received between the disk assemblies 36 and (if tall enough) is bent forwardly by engagement with the reel shaft 34. The successive actuation of the finger unit 68 of each disk assembly can best be seen with reference to FIGS. 3 and 7. The unit 68' is shown rotated to a position at which the roller 94' thereof (FIG. 7) is about to roll along the relatively steep portion of the cam lobe 106. The next unit 68'' has been rotated to a position wherein the roller 94'' thereof is in engagement with the lobe 106 along its maximum axial extent. The units 68' and 68'' thus illustrate the inoperative and operative positions respectively with the fingers of the unit 68'' at their maximum extention for engaging the standing crop and moving it rearwardly over the cutter 30. The unit 68''' is shown wherein its roller 94''' has rolled along the cam lobe 106 back to the same disposition as that of the roller 94' to thus have swung the fingers thereof back to the inoperative position under the force of the respective coil spring 86. The roller 94''' is shown about to travel along the strip 108 of cushioning material which helps to reduce vibration and noise of operation.

The point during rotation of the reel at which the fingers are moved to the operative position can be preselected by connecting the cam member 96 to the respective brace 116 at any one of the angularly spaced positions provided by the plurality of openings 124.

What is claimed is:

1. In a crop-harvesting platform having a cutter extending transversely to the forward direction of travel of the platform, an improved crop-gathering reel on the platform comprising:
    a rotatable shaft journalled on said platform above and generally parallel to said cutter;
    a generally circular disc assembly mounted on said shaft for rotation therewith in a direction wherein the lower periphery of said assembly is moved rearwardly over said cutter, said disc assembly projecting radially from said shaft to define crop-receiving spaces on opposite sides axially thereof;
    a pair of crop-engageable fingers mounted on said disc assembly for rotation therewith, said fingers being pivotally mounted on spaced parallel axes in a common plane disposed at right angles to said shaft and including angularly extending crop-engaging portions disposed beyond the outer periphery of said disc assembly, said fingers being pivotable about said axes between an inoperative position wherein said portions are disposed in said common plane and in trailing relation to the direction of rotation of said disc assembly and an operative position wherein said portions project into the respective crop-receiving spaces;
    and means for conjointly pivoting said fingers in opposite directions from said inoperative position to said operative position in response to the rotation of said disc assembly moving said fingers rearwardly over said cutter, thereby disposing said crop-engaging portions into the respective crop-receiving spaces to engage a standing crop and move the same rearwardly for cutting by said cutter.

2. The subject matter of claim 1, wherein said disc assembly is defined by a pair of annular covers disposed about said shaft and defining radially outwardly converging walls which present a progressively radially narrowing crop penetrating profile to minimize deflection of the standing crop.

3. The subject matter of claim 2, wherein said means for conjointly pivoting said fingers includes a cam fixed against rotation, a roller operatively associated with said fingers for rotation with said disc assembly in a path which intersects said cam so that said fingers are pivoted in response to engagement of said cam by said roller, said cam and said roller being disposed to effect cooperative engagement between said annular covers so as to be disposed out of crop-entangling relation.

4. An improved crop-gathering reel for a harvesting platform adapted for cutting a standing crop, comprising:
    a driven shaft extending across the platform;
    a plurality of disc assemblies mounted on said shaft for rotation therewith in spaced parallel relation generally perpendicular to the axis of said shaft and defining crop-receiving spaces therebetween;
    a plurality of multiple-finger units carried on each of said disc assemblies in circumferentially spaced relation, each of said units including a pair of fingers journalled within the respective disc assembly and including a crop engageable portion disposed radially beyond the outer periphery of the disc assembly;
    means mounting each of said pairs of fingers about parallel axes disposed in a common plane perpendicular to the axis of said driven shaft for swingable movement between a retracted position wherein said crop-engageable portions are disposed in said common plane and an operative position wherein said portions are disposed into the crop-receiving spaces for engaging the standing crop and moving the same rearwardly for cutting as the reel is rotated;
    cam means affixed against rotation and successively engageable by said finger units to swing the fingers thereof into the operative position;
    and spring means operative on said fingers to bias said fingers toward the retracted position.

5. The subject matter of claim 4, including means for adjustably preselecting the position of said cam means to vary the point during rotation of the reel at which said fingers are swung into the operative position.

6. The subject matter of claim 4, wherein the crop-engageable portion of each of said fingers comprises an elongate section extending at a right angle from the axis of movement of the finger, said section extending away from said axis of movement in a direction opposite to the direction of rotation of the reel when the fingers are in said retracted position.

7. The subject matter of claim 4, wherein a roller is connected to one of the fingers in each pair, said roller being engageable by said cam means to swing said one finger into the operative position, and a linkage interconnecting said one finger with the other finger in each pair to provide a conjoint swinging movement of the fingers in opposite directions when said roller engages said cam means.

8. The subject matter of claim 7, wherein said cam means includes a cam member associated with each of said disc assemblies, said cam member including a cylinderical hub portion received about said shaft and a lobe portion disposed in the path of revolution of said roller.

9. The subject matter of claim 8, wherein each of said disk assemblies includes a pair of axially juxtaposed covers secured together to enclose said cam lobe portion, roller, and finger linkage therebetween so as to prevent crop-entanglement therewith.

10. In a crop-harvesting platform having a cutter extending transversely to the forward direction of travel of the platform, an improved crop-gathering reel on the platform comprising:
a driven shaft extending across said platform above and parallel to said cutter and having at least one generally circular disc assembly secured thereon for rotation therewith, said disc assembly being disposed at substantially right angles to and concentric with the axis of said shaft so as to project radially therefrom to define crop-receiving spaces on opposite sides axially thereof;
at least one pair of crop-engageable fingers swingably mounted on said disc assembly and projecting radially beyond the periphery thereof for movement in parallel planes generally tangential to said disc assembly;
and means for conjointly swinging the fingers of said pair in opposite directions in said planes as the fingers move rearwardly over said cutter to dispose the respective fingers into the respective crop-receiving spaces to engage a standing crop and move the same rearwardly for cutting by said cutter.

11. The subject matter of claim 10, wherein said disc assembly is defined by a pair of axially spaced annular covers defining radially outwardly converging walls presenting a progressively narrowing crop penetrating profile to minimize crop deflection.

12. The subject matter of claim 10, wherein said means for swinging said fingers includes a cam fixed against rotation, a roller connected to said one of said fingers and disposed for rotation with said disc assembly in a path which intersects said cam so that said one finger is moved in response to engagement of said cam by said roller, and a linkage interconnecting said fingers for conjoint movement thereof in opposite directions.

13. The subject matter of claim 10, wherein said pair of fingers is disposed for swingable movement about a respective pair of parallel axes in a common plane disposed at right angles to the axis of said shaft.

14. In a crop-harvesting platform having a cutter extending transversely to the forward direction of travel of the platform, an improved crop-gathering reel on the platform comprising:
a driven shaft extending across said platform above and parallel to said cutter and having at least one generally circular disc assembly secured thereon for rotation therewith, said disc assembly being disposed at substantially right angles to and concentric with the axis of said shaft so as to project radially therefrom to define crop-receiving spaces on opposite sides axially thereof;
at least one pair of crop-engageable fingers mounted on said disc assembly for rotation therewith about the axis of said shaft, said fingers being pivotally mounted on spaced axes in a common plane disposed at right angles to said shaft and including angularly extending crop-engaging portions disposed beyond the outer periphery of said disc assembly, said fingers being pivotable between an inoperative position wherein said portions are disposed in said common plane and in trailing relation to the direction of rotation of said disc assembly and an operative position wherein said portions project into the respective crop-receiving spaces;
and means for conjointly pivoting the fingers of said pair in opposite directions from said inoperative position to said operative position as the fingers move rearwardly over said cutter to engage a standing crop in said spaces to move the same rearwardly for cutting by said cutter.

15. The subject matter of claim 14, wherein said means for conjointly pivoting the fingers includes a cam member associated with said shaft and a roller associated with said fingers for intermittent interengagement, said cam member including a cylindrical hub mounted on said shaft, an annular flange on said hub projecting radially outwardly therefrom, a cam lobe projecting axially from said flange and concentrically about the axis of said shaft throughout an arc which defines the extent of operative engagement by said roller to swing said fingers from said inoperative position to said operative position and back to said inoperative position as said shaft is rotated.

16. The subject matter of claim 15, including spring means operative to maintain said roller in engagement with said cam lobe during rotation.

17. The subject matter of claim 15, including means for adjustably preselecting the position of said cam member about the axis of said shaft to vary the point at which the fingers begin to swing from the inoperative to the operative position.

18. The subject matter of claim 15, including a strip of non-metallic cushioning material on said annular flange in trailing relation to said cam lobe to provide a cushioning surface against which said roller may engage to decrease the noise of operation.

19. In a crop-harvesting platform having a cutter extending transversly to the forward direction of travel for cutting a standing crop, an improved crop-gathering reel on the platform comprising:
a rotatable shaft journalled on said platform and disposed above and parallel to said cutter;

a plurality of generally circular disc assemblies mounted on said shaft for rotation therewith in a direction wherein the lower periphery of each assembly is moved rearwardly over said cutter, said disc assemblies being disposed in axially spaced relation to define crop-receiving spaces therebetween;

crop-engaging fingers pivotally mounted on said disc assemblies for pivotal movement from an inoperative position to an operative position wherein said fingers extend into said crop-receiving spaces;

means associated with each of said disc assemblies for successively pivoting the fingers thereof into said operative position in response to rotation of said shaft, said means including rollers operatively connected to said fingers and a cam successively engageable by said rollers;

and means mounting the cam of each disc assembly in a plurality of preselected positions to vary the point during rotation at which the fingers are successively pivoted to said operative position.

20. The subject matter of claim 19, wherein each of said cams includes a hub portion journalled on said shaft adjacent to the respective disc assembly, an annular flange on said hub projecting radially outwardly therefrom, a cam lobe projecting axially from said flange and concentrically about the axis of said shaft throughout an arc which defines the extent of operative engagement by said roller to swing said fingers from said inoperative position to said operative position and back to said inoperative position as said shaft is rotated.

21. The subject matter of claim 20, including means for adjustably preselecting the position of said cam member about the axis of said shaft to vary the point at which the fingers begin to swing from the inoperative position to the operative position.

22. In a crop harvesting platform having a cutter extending transversely to the forward direction of travel for cutting a standing crop, an improved crop-gathering reel for the platform comprising:

a pair of arms mounted on said platform at opposite ends thereof;

a driven shaft journaled on said arms and disposed above and parallel to said cutter;

a plurality of parallel disc assemblies mounted on said shaft in axially spaced relation to define crop-receiving spaces therebetween;

crop-engaging fingers swingably mounted on said disc assemblies;

means associated with each of said disc assemblies for swinging the fingers thereof into said crop-receiving spaces to move the crop rearwardly toward said cutter, said means including a roller connected to said fingers and a cam engageable by said roller;

and means mounting each of said cams against rotation including a bar mounted on said arms, a plurality of braces projecting from said bar toward said shaft successively between said disc assemblies, and means connecting the respective cams with the respective braces.

23. The subject matter of claim 22, including means for connecting each cam to its respective brace in a plurality of positions relative to the brace angularly displaced about the axis of said shaft.

* * * * *

UNITED STATES PATENT OFFICE
CERTIFICATE OF CORRECTION

Patent No. 3,807,153      Dated April 30, 1974

Inventor(s) Reynold Barkstroma, Charles V. Everett, Harold G. Meitl

It is certified that error appears in the above-identified patent and that said Letters Patent are hereby corrected as shown below:

Names should be corrected to appear as follows;

Reynold Barkstrom, Charles V. Everett, Harold G. Meitl

Signed and sealed this 19th day of November 1974.

(SEAL)
Attest:

McCOY M. GIBSON JR.
Attesting Officer

C. MARSHALL DANN
Commissioner of Patents